J. O. FOWLER.
WEIGHING AND VENDING MACHINE.
APPLICATION FILED JULY 25, 1910.
985,890.
Patented Mar. 7, 1911.
3 SHEETS—SHEET 1.
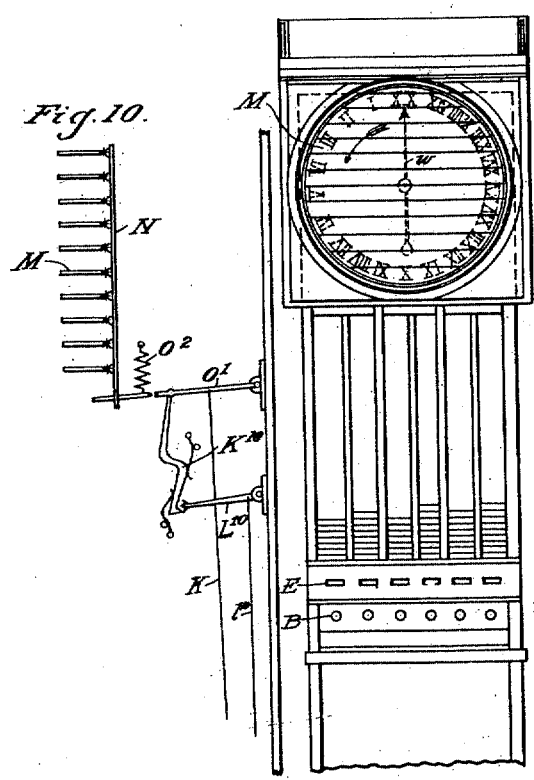
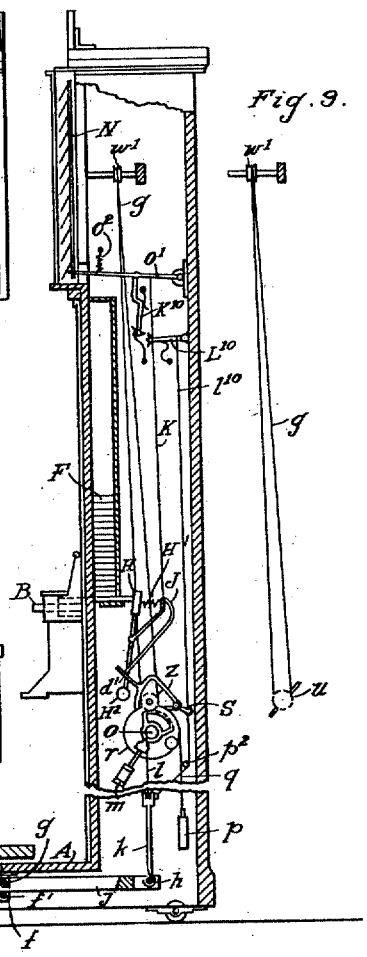
WITNESSES:
INVENTOR
J. O. Fowler J. O. FOWLER.
WEIGHING AND VENDING MACHINE.
APPLICATION FILED JULY 25, 1910.
985,890.
Patented Mar. 7, 1911.
3 SHEETS—SHEET 2.
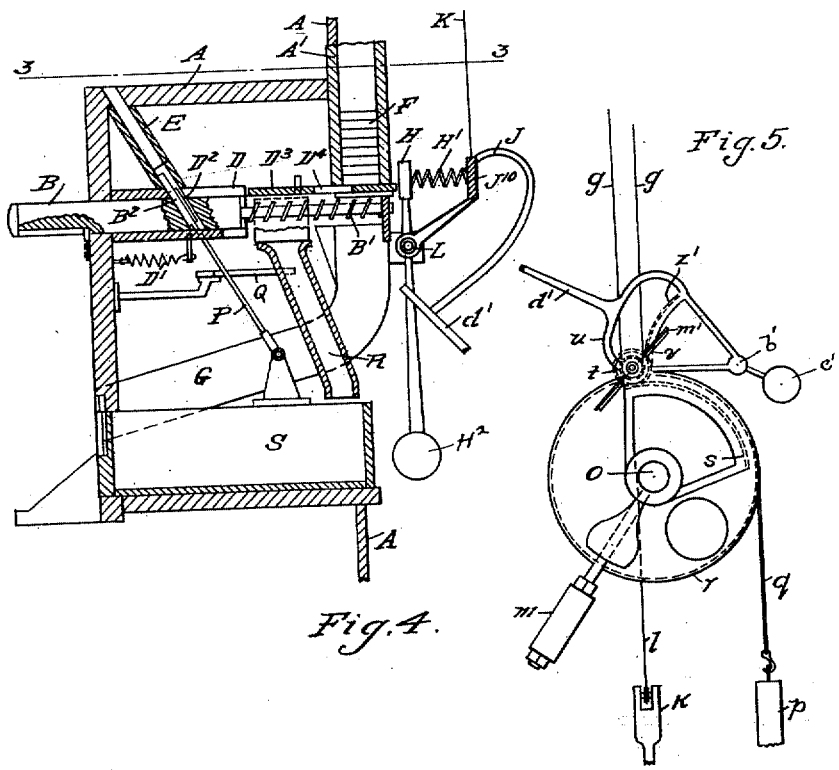
WITNESSES:
INVENTOR
J. O. Fowler

J. O. FOWLER.
WEIGHING AND VENDING MACHINE.
APPLICATION FILED JULY 25, 1910.

985,890.

Patented Mar. 7, 1911.

3 SHEETS—SHEET 3.

WITNESSES:
R H Smith

INVENTOR
J. O. Fowler

UNITED STATES PATENT OFFICE.

JONATHAN O. FOWLER, OF NEW YORK, N. Y.

WEIGHING AND VENDING MACHINE.

985,890. Specification of Letters Patent. Patented Mar. 7, 1911.

Continuation of application Serial No. 721,311, filed June 21, 1899. This application filed July 25, 1910.
Serial No. 573,618.

*To all whom it may concern:*

Be it known that I, JONATHAN O. FOWLER, a citizen of the United States, and a resident of New York, in the county and State of New York, have invented a certain new and useful Weighing and Vending Machine, of which the following is a specification, the same being a full, clear, and exact description of the invention, such as will enable others skilled in the art to which it appertains to make and use the same, this application being a continuation of my application Serial No. 721,311, filed June 21, 1899.

My invention relates to coin controlled apparatuses and particularly to that class of machines employed for vending articles and for weighing persons or materials, and it has for its object the provision of an appliance of the kind set forth, simple in construction and inexpensive to manufacture, and which operates smoothly and efficiently in practical use.

To attain the desired end, this, my invention consists in the construction, arrangement and operation of parts herein set forth.

Figure 6:
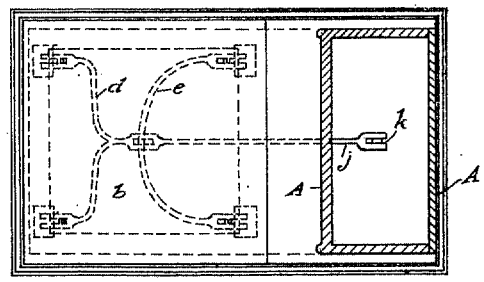
Figure 7:
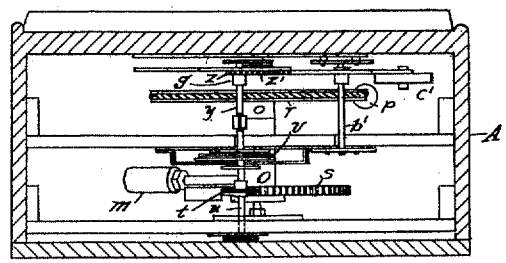
Figure 8:
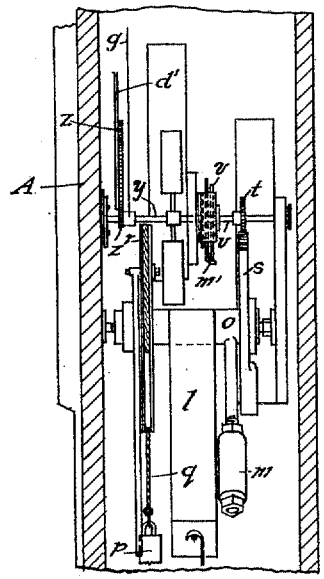

In the drawings which accompany and form a part of this specification, Figure 1 represents a partial front elevation of my machine, the dial and goods receptacle being shown; Fig. 2 is a vertical section of my machine; Figs. 3 and 4 are respectively plan views and elevations, partly in section, of the manually actuated apparatus; Fig. 5 is a detail of the scale counterbalance mechanism; Fig. 6 is a horizontal section of Fig. 2 taken along a line just above the weighing platform; Fig. 7 is a plan view, partly in section, of the weighing mechanism; Fig. 8 is an elevation, partly in section, of the same; Fig. 9 is a view in detail of the connection of the index pulley with the platform actuated weighing mechanism; and Fig. 10 is a view in detail of my dial concealing mechanism.

Like letters of reference indicate like parts in all the views.

I have found it desirable to make a machine that will indicate the weight of a person and which also serves to dispense or vend a predetermined number of articles upon the insertion of a coin, and I have therefore constructed, according to my invention, an organization of the class described, embodying the preferred construction of parts, and their mutual relationship, combination, arrangement and organization in a composite body or structure, as hereinafter described.

Referring particularly to the drawings, in which one example of my invention is embodied, A denotes the case or frame of a machine. The weighing devices proper, *per se*, shown and described as being contained therein, are not new, and are not claimed by me as my invention except in combination or coöperation with the other mechanism, and other weighing devices may be substituted therefor. The platform $b$ of the machine is supported on knife edges $c$ carried upon lever frames $d$ and $e$, which are suspended by means of hooks $f$, from knife edges $f'$, fixed to the frame A. The lever frame $e$ is similarly suspended on a knife edge $e'$ by a hook $i$ extending from the lever frame $d$. A lever or arm $j$ consisting of an extension of the lever frame $d$ serves, by means of the hooked lever or rod $k$ and steel ribbon $l$, to connect the platform $b$ with the weight $p$. The arm $j$ is provided with a knife edge bearing $h$ in the lower or hooked end of the rod $k$. The weighted arm $m$, projecting from the pivoted spindle $o$ forms, together with the weight $p$, the counterpoise. A cord $q$, by which the weight $p$ is suspended, passes against the pulleys $p^2$, and $r$, fixed on the spindle $o$.

The steel ribbon $l$ is attached to and wound upon a spindle $o$ so that when a weight is placed on the platform $b$ the said ribbon will partly rotate the spindle $o$, cord $q$, and pulley $r$, and the weight $p$ will be raised and the weighted arm $m$ will partly rotate in the direction shown by the arrow until the weights $m$ and $p$ counterbalance the body to be weighed. A toothed quadrant $s$, fixed on the spindle $o$, serves to operate, when the spindle is rotated, a pinion $t$ fixed upon an arbor $u$, and which carries at one end the rod $v$. The index $w$ moves over a dial and is connected with the grooved hub of the pinion $z$ by the belt $g$ which is hung on the pulley $w'$, and which is engaged, as stated, with the hub of the pinion $z$ located on the arbor $y$.

The arbors $y$ and $u$ carry at their inner ends respectively the stop $m'$ and the rod $v$. On the arbor $y$ is fixed the said pinion $z$ which meshes with a quadrant $z'$ pivoted at $b'$ and provided with a counterweight $c'$. The stop $m'$ regulates the movement of the index w by coming in contact with the index rod v. The stop m' is fixed on the inner end of the arbor y, and when the arm d' is rotated, as hereinafter described, the quadrant z' and stop m' will rotate until its projection meets the bar v, when it will be stopped in proper position to indicate by means of the index w (the pulley w' of which is connected with the pulley of the pinion z on the arbor y by the belt g) the weight of the person on the platform b. I sometimes connect the pulley w' with the pulley on the arbor u, in lieu of the pinion z of the arbor y, as shown in Fig. 9.

In order to press the arm d' of the quadrant z' backward by mechanism controlled by the insertion of a coin, I provide the following means. A horizontal plunger B, normally held in a forward position by a spring B', is provided with a slot B² registering with a slot D² of the sleeve D (normally held in position by a spring D') and working within the sleeve D. Upon a coin being inserted in the chute E, the plunger B and sleeve D will become engaged or locked together, and by pushing the said plunger inward, the plate D³ (of the sleeve D) will travel backward until the recess D⁴ comes under a pile of packages F to be vended, whereupon one of said packages will enter the said recess, and will be carried along and allowed to drop into the delivery chute G upon the return or backward movement of said plate D³, when the plunger B is released.

It will be observed that the goods dispensing mechanism moves with a reciprocatory action. By the word "reciprocatory" I mean the movement of any part that advances and recedes successively, or moves alternately forward, in either a horizontal or circular direction, and backward again, whether the same is a sliding or pivoted part:—it being manifest that a variety of such well known devices, as ratchet and pawl, and bell crank, movements are commonly used in coin controlled dispensing mechanisms, any of which may, if desired, be substituted for the particular reciprocating goods dispensing means shown and described.

The forward movement of the plate D³ serves to rotate a swinging arm H normally held in vertical position by a weight H² and pivoted at L. The arm J, and bar J¹⁰, also pivoted at L, is connected with the arms H by means of springs H' and serves (upon a plunger B being pushed in and an arm H thereby rotated) to depress the arm d' of the quadrant z', by which means the pinion z and quadrant z' are turned around until the stop m' and bar v are contacted, thereby indicating the proper weight, as hereinafter described.

The quadrant s located on the spindle o, which turns the pinion t, carrying the rod v and mounted on the arbor u, together with its inter-related parts, are operated by the depression of the platform caused by the loading of the same. The pinion z, which is located on the arbor y, and which carries the arm d', meshes with the counterbalanced quadrant z', and is independent of the platform operated mechanism, and would therefore be always self-restorative when moved, were it not for being held in check by reason of the arm d' being held from assuming an elevated position by the arm J of the swinging bar J¹⁰, which bar extends behind all of the arms H which are respectively operated by the plungers B, which bar J¹⁰ serves, as described before, to operate the common weight denotating device. The arms H may be selectively operated by a coin without the use of the manually actuated plunger B if desired.

The plunger, or manually actuated device B, serves, as stated, to operate the device consisting of the sleeve D, forming in connection with the chute A', the compartment article containing and retaining apparatus which works with a positive movement to release from the compartment and to deliver into the discharge chute G, at one operation, a predetermined quantity of the stock contained therein, at any time a coin is inserted into the machine.

Upon a plunger B being pushed inwardly, one of the arms H will compress the spring H' and cause the bar J¹⁰ and arm J to be operated, which operation will serve to depress the arm d' until the stop m' of the arbor y engages the bar v, thereby stopping its movement, the different positions of the said point of engagement being variable according to the weight of the load on the platform, and such variable point of engagement being allowed by the resilience of the spring H', which, with the same fixed movement of the plunger B, will allow the arm d', and consequently the index or pointer w, to assume different weight denotating positions, according to the various weight on the actuating movable part or platform of the weighing mechanism.

The denotation of the weight given, so soon as the parts are unlocked by the insertion of the coin, is of a fixed and determinate character, corresponding to the load on the platform. After either the vending or the weighing operation has been had, each of the said mechanisms of the machine is returned to its normal locked non-operative position, and upon the machine being once unlocked, or even lightened, the weight denotating device is held from any further movement, irrespective of any relocking of the machine, until the insertion of another coin.

The weighing apparatus is of a dual character, as, although the weighing operation proper is performed by the mechanism connected with the platform of the scales, yet no indication of the weight may be had until the manually actuated means, as the plunger B, is operated, by means of which (and the connecting cord K) the shutters M are opened.

The plunger B serves to act in a dual capacity, as, in the first place, upon a coin being inserted, and it being actuated, an article of merchandise is necessarily vended, and, secondly, at the same time that the plunger moves inwardly, it serves the additional purpose of disclosing the weight indicated, in the following manner:—The weighing mechanism proper is actuated, as stated, by the devices connected with the platform, whereby the bar $v$ of the arbor $u$ (Figs. 7 and 8) is moved to a position corresponding to the load on the platform, but no weight indication can be given thereby, the pointer being disconnected from the same and therefore being non-operative, the shutters M being so held by the bar $o'$. In order to bring the pointer into operative connection with the weighing mechanism proper, it is necessary to insert the coin and push one of the manually actuated plungers B inwardly, thereupon the plate $D^3$ of the plunger inclosing sleeve D will push an adjacent swinging arm H also inwardly, and the consequent compression of the spring H' connected therewith, serves to force the common bar $J^{10}$ backward, thus opening the shutters M by means of the cord K with a differential action caused by the resilience of the spring $o^2$ and the movement of the arm J, in the meantime, serving to depress the arm $d'$ and to thereby rotate the pinion $z$ on the arbor $y$, until the said movement is stopped by the engagement of the stop $m'$ of the arbor $y$ with the bar $v$ of the arbor $u$ of the weighing mechanism proper. The grooved hub of the pinion $z$ is connected by a belt $g$ with the pulley $w'$ of the pointer, and the said movement of the pinion $z$ (until the movement of its arbor $y$ is stopped by engagement of the stop $m'$ with the bar $v$) will cause the pointer to indicate the weight on the platform.

Each manually actuated plunger thus serves (1) to dispense an article of merchandise, (2) to open the shutters M, and also (3) to move the pointer until it is stopped by engagement of its actuating pinion $z$ (through the stop $m'$ of the arbor $y$) with the bar $v$ of the weighing mechanism proper, and each one of the series of manually actuated plungers is used in operative connection with the common weighing mechanism, and also in combination with the common weight indicating device. Thus no weight indication may be had without the actuation of one of the plungers B, but at least one article may be vended without a weighing operation being had, as, if the operator does not stand on the platform, the actuation of a plunger B will cause the shutters M to be opened, but, as, in this case, the arm $d'$ cannot be moved downward (as the bar $v$ is not moved rearward) no weight indication will be displayed, the springs H' serving to prevent any disarrangement or straining of the parts.

Inasmuch as each plunger B has its own compensating spring H' it will move the arm $d'$ a different distance (corresponding to the load on the platform) and there is a separate, different and distinct differential co-action between each plunger B, or a series of them moved simultaneously, and the common bar $J^{10}$; and another differential action between the plate $D^3$ and the lever $o'$ and spring $o^2$, and consequently, with the arm $d'$ of the weight indication device. Obviously, the arms H and bar $J^{10}$ might be actuated directly by the weight of the coin, in lieu of having the same operated by the manually actuated plungers B.

The aforesaid movement of the arm J serves also to pull in a downward direction a wire K secured to the lever $o'$ (held up by a spring $o^2$) which lever is connected in a movable relation with the rod N attached to one side (ordinarily near the corner) of a series of pivoted, preferably rectangular slats M, and thus to open the normally closed slats or shutters, and to expose to view the scale-face or dial, and the index $w$. In order to discharge the coin, I provide a spring arm P the end of which always registers with, or lies in, the slot $D^2$ of the sleeve D, and whenever the said sleeve is pushed forward or inward, the spring arm P rides along the cam-edge Q and gradually forces the coin out of the slot until it drops in the delivery chute R and thence falls into the money receptacle S.

The swinging arms H lie behind each of the plates $D^3$. Consequently, when either of the plungers B are operated (of which six are shown in the present embodiment) the common or universal swinging arm $J^{10}$ will be operated, and the mechanism of the machine to give various denotations or indications of weights will be actuated, and the particular article controlled by the selected plunger B will be released by the goods delivery mechanism. Thus, in a machine constructed according to my invention, one of the normally non-operative plurality of goods actuating mechanisms, together with the common normally non-operative denoting or indicating device (ordinarily provided with an actuated and movable part located intermediate the two said mechanisms and the platform, and adapted to be moved by the operator, as through the agency of a platform operated device) will be actuated by operating the manually actuated element, preferably consisting, as in the present instance, of a plunger.

It is manifest that various omissions of some particulars could be made without materially affecting essential features of my invention, or the operation of the remaining parts, and I do not, therefore, wish to be limited to the specific structural details of the organization herein set forth. Obviously, the elements of the structure described may be located at an angle to the plane in which they are shown. I, accordingly, use the words "horizontal", "vertical", and the like, in a relative sense.

In operation, upon stepping on the platform and inserting a coin in the slot, and also pushing in the plunger, the slats M will be opened, disclosing the dial face, and immediately afterward a package of candy, etc., will be discharged through the chute G and thus delivered to the person getting weighed. It is obvious that the slats M may be dispensed with, in which case the belt $g$ is preferably placed on the pinion of the arbor $y$, but in cases where the slats M are used, the said belt, if preferred, may be put directly upon a pulley on the arbor $u$, and the index $w$ thus moved by the mechanism connected with the platform $b$, and the bar $v$ may be dispensed with.

A pivoted arm $K^{10}$ depends from the lever $o'$ and is constructed and arranged to engage with the lever $L^{10}$ (journaled to the case A and connected by cord $l^{10}$ with the rod $k$ of the lever $j$) when the wire K is pulled downward, and to continue in engagement therewith until the person steps off the platform of the scales, whereby, upon the wire K and lever $L^{10}$ being allowed to rise, the spring controlled lever $o'$ ascends again, the arm $K^{10}$ being in the meantime moved backward far enough to clear the lever $L^{10}$ by means of spring fingers located adjacent thereto.

The function of the two spring fingers in pushing the arm $K^{10}$ backward, or to the left, is as follows: When the arm $K^{10}$ is in its highest position, the upper spring pushes it back, and the lower spring finger also pulls it backward. Upon the said depending arm $K^{10}$ being depressed, by reason of the lever $o'$ becoming lowered, the upper spring will exert but very little power on the arm $K^{10}$, and the lower part of the lower spring will push the said arm forward until it interlocks with the lever $L^{10}$. After a plunger B has been released, the arm $K^{10}$ will be held in position solely by the engagement with the point of the same of the edge of the lever $L^{10}$, and upon the slightest upward or retrograde movement of the latter, both the arm $K^{10}$ and the lever $o'$ will rise somewhat, and then the arm $K^{10}$ will be moved backward by both of the springs engaged therewith, and the lever $o'$ will be freed and allowed to rise a sufficient distance to cause the indication of the weight to cease.

It is obvious that my invention may be applied to a great variety of coin freed vending or renting devices, such as machines dispensing perfumery, or lemonade, or gas, etc., or to apparatuses where the use of an article, as a telephone, is rented by means of a coin controlled device.

It will be noted that the coin controlled mechanism shown and described may be actuated, equally as well, whether the coin is inserted before or after the scale platform has been depressed, and also that the said mechanism is constructed and arranged to perform only one vending operation upon the insertion of a single coin, even though the said platform be moved successively in an upward and downward direction, without releasing the pressure therefrom.

Many weight giving or indicating machines are now in general use, as for example, those where the weight of a person is shown by the release of the balancing mechanism; those where the release of an indicator is effected, which then moves under a previously applied power into a position controlled by the balancing mechanism; those where the actuation of an indicator is effected by a subsequently applied force, so as to cause it to assume such a position; those where the printing of a ticket, or otherwise making a record, is accomplished; and those where the removal of an obstruction is effected which would prevent an indicator from being seen. By the words weight indicating or denotating means, or weight giving device, I, therefore, mean any device known in the art to effect the weighing of a person, as manifestly any well known weighing device may be substituted for the particular weighing means shown and described. I believe that I am the first to make a combined weighing mechanism and vending apparatus, with the advantages and in the manner set forth in the claims, to deliver *seriatim* a number of packages containing confections or masticatories, etc., and constructed and arranged to be operated after the platform has been depressed, and to perform only one vending operation upon the insertion of a single coin, i. e. the vending apparatus can not be operated successively by the depression of the platform a number of times in cases where only one coin is inserted.

As it is evident that many changes in the construction and relative arrangement of parts might be resorted to without departing from the spirit and scope of my invention, I would have it understood that I do not restrict myself to the particular construction and arrangement of parts shown

What I claim as my invention, is:—

1. In a coin controlled machine, a normally movable platform $b$, and mechanism to move in unison therewith, comprising a platform rod $k$, ribbon $l$, spindle $o$, quadrant $s$, pinion $t$, arbor $u$, and rod or bar $v$; mechanism comprising a swinging arm H, bar $J^{10}$, cord K and shutters M, coöperatively acting to give a single denotation of a weight only, of a fixed and determinate character, and corresponding with the platform load, at each operation; means comprising a lever $o'$, normally disengaged from and unaffected by the descent or retrograde movement of the platform and the platform operated device to hold the weight denotating mechanism in a non-operative condition; a normally non-operative article releasing mechanism comprising a plate $D^3$ and recess $D^4$ coöperatively acting to release a predetermined quantity of stock only at each operation, and normally disengaged from and unaffected by the operation of the mechanism actuated by the movement of the platform; and a coin controlled intermediate device comprising a sleeve D, arm J, arm $d'$, pinion $z$, arbor $y$, stop $m'$ and coöperating spring $o^2$, normally disengaged from and unaffected by the descent or retrograde movement of the platform and the platform operated device, but impelled by the coin and adapted to move positively both the weight denotating device and the article releasing mechanism in unison with its own movement once only upon the insertion of a coin; in combination with means, comprising the counterpoise $m$, $p$, and weight $c'$ to return, after either of the operations has been had, the parts to their normal disengaged and locked condition.

2. In a coin controlled machine, a normally movable platform $b$, and mechanism to move in unison therewith comprising a platform rod $k$, ribbon $l$, spindle $o$, quadrant $s$, pinion $t$, arbor $u$, and rod or bar $v$; mechanism comprising a swinging arm H, bar $J^{10}$, cord K and shutters M coöperatively acting to give a single denotation of a weight only, of a fixed and determinate character and corresponding with the platform load, at each operation; means comprising a lever $o'$ normally disengaged from and unaffected by the descent or retrograde movement of the platform and the platform operated device to hold the weight denotating mechanism in a non-operative condition; and a coin controlled intermediate device comprising a sleeve D, arm J, arm $d'$, pinion $z$, arbor $y$, stop $m'$ and compensating spring $o^2$, normally disengaged from and unaffected by the descent or retrograde movement of the platform and the platform operated device, but impelled by the coin and adapted to move positively the weight and adapted to move positively the weight denotating device in unison with its own movement once only upon the insertion of a coin; in combination with means comprising the counterpoise $m$, $p$, and weight $c'$ to return, after the operation has been had, the parts to their normal disengaged and locked condition.

3. In a coin controlled machine, a normally movable platform $b$, and mechanism to move in unison therewith, comprising a platform rod $k$, ribbon $l$, spindle $o$, quadrant $s$, pinion $t$, arbor $u$, and rod or bar $v$; mechanism comprising a swinging arm H, bar $J^{10}$, cord K and shutters M, coöperatively acting to give a single denotation of a weight only, of a fixed and determinate character, and corresponding with the platform load, at each operation; means comprising a lever $o'$, normally disengaged from and unaffected by the descent or retrograde movement of the platform and the platform operated device to hold the weight denotating mechanism in a non-operative condition; a normally non-operative article releasing mechanism comprising a plate $D^3$ and recess $D^4$ coöperatively acting to release a predetermined quantity of stock only at each operation, and normally disengaged from and unaffected by the operation of the mechanism actuated by the movement of the platform; a coin controlled intermediate device comprising a sleeve D, arm J, arm $d'$, pinion $z$, arbor $y$, stop $m'$ and coöperating spring $o^2$, normally disengaged from and unaffected by the descent or retrograde movement of the platform and the platform operated device, but impelled by the coin and adapted to move positively both the weight denotating device and the article releasing mechanism in unison with its own movement once only upon the insertion of a coin; and means consisting of a compensating or take up spring $H'$ to control the operation of the said intermediate mechanism to render the article releasing mechanism operative, either jointly with, or by a differential movement without, actuating the weighing mechanism; in combination with means, comprising the counterpoise $m$, $p$, and weight $c'$ to return, after either of the operations has been had, the parts to their normal disengaged and locked condition.

4. In a coin controlled machine, a normally movable platform $b$, and mechanism to move in unison therewith comprising a platform rod $k$, ribbon $l$, spindle $o$, quadrant $s$, pinion $t$, arbor $u$, and rod or bar $v$; mechanism comprising a swinging arm H, bar $J^{10}$, cord K and shutters M coöperatively acting to give a single denotation of a weight only, of a fixed and determinate character and corresponding with the platform load, at each operation; means comprising a lever $o'$ normally disengaged from and unaffected by the descent or retrograde movement of the platform and the platform operated device to hold the weight denotating mechanism in a non-operative condition; a plurality of normally non-operative article releasing mechanisms each comprising a plate D³ and recess D⁴ coöperatively acting to release a predetermined quantity of stock only at each operation, and normally disengaged from and unaffected by the operation of the mechanism actuated by the movement of the platform; a coin controlled intermediate device comprising a sleeve D, arm J, arm $d'$, pinion $z$, arbor $y$, stop $m'$ and compensating spring $o^2$, normally disengaged from and unaffected by the descent or retrograde movement of the platform and the platform operated device, but impelled by the coin and adapted to move positively both the weight denotating device and one of the article releasing mechanisms in unison with its own movement once only upon the insertion of a coin; and a plurality of independent manually actuated devices B, having a fixed movement to control either one of the article releasing mechanisms, or, simultaneously, several of the same differentially, or jointly both the same and the weighing mechanism and also the mechanism to give a denotation of a weight, and having a compensating or take up device for varying weights to produce a differential action; in combination with means, comprising the counterpoise $m$, $p$, and weight $c'$ to return, after either of the operations has been had, the parts to their normal disengaged and locked condition.

5. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a normally non-operative article releasing mechanism comprising a plurality of elements coöperatively acting to release a predetermined quantity of stock only at each operation and normally disengaged from and unaffected by the operation of the device actuated by the movement of the platform; and an intermediate mechanism comprising a plurality of elements adapted to be but once moved by the coin a variable distance according to the particular weight on the platform, and to move the weight denotating mechanism with a positive impelling movement to contact the platform operated device, and also to actuate, with a certain fixed and definite movement, the article releasing mechanism in unison with its own movement; in combination with means to return, after either of the operations has been had, the parts to their normal disengaged and locked condition.

6. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a normally non-operative article releasing mechanism comprising a plurality of elements coöperatively acting to release a predetermined quantity of stock only at each operation and normally disengaged from and unaffected by the operation of the device actuated by the movement of the platform; an intermediate mechanism comprising a plurality of elements adapted to be but once moved by the coin a variable distance according to the particular weight on the platform, and to move the weight denotating mechanism with a positive impelling movement to contact the platform operated device, and also to actuate, with a certain fixed and definite movement, the article releasing mechanism in unison with its own movement; and means consisting of a compensating or take up device to control the operation of the said intermediate mechanism to render the article releasing mechanism operative either jointly with, or, by a differential action, without actuating the weighing mechanism; in combination with means to return, after either of the operations has been had, the parts to their normal disengaged and locked condition.

7. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a normally non-operative article releasing mechanism comprising a plurality of elements coöperatively acting to release a predetermined quantity of stock only at each operation and normally disengaged from and unaffected by the operation of the device actuated by the movement of the platform; an intermediate mechanism comprising a plurality of elements, adapted to be but once moved by the coin a variable distance according to the particular weight on the platform, and to move the weight denotating mechanism with a positive impelling movement to contact the platform operated device, and also to actuate, with a certain fixed and definite movement, the article releasing mechanism in unison with its own movement; and manually actuated means having a fixed movement to control either the article releasing mechanism alone, or jointly, the same and the mechanism to give a denotation of a weight, and having a compensating or take up device for varying weights to produce a differential action; in combination with means to return, after either of the operations has been had, the parts to their normal disengaged and locked condition.

8. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation, means normally disengaged from and unaffected by the descent or retrograde movement of the platform and the platform operated device, to hold the weight denotating mechanism in a non-operative condition, a normally non-operative article releasing mechanism comprising a plurality of elements coöperatively acting to release a predetermined quantity of stock only at each operation and normally disengaged from and unaffected by the operation of the device actuated by the movement of the platform; an intermediate mechanism comprising a plurality of elements adapted to be but once moved by the coin a variable distance according to the particular weight on the platform, and to move the weight denotating mechanism with a positive impelling movement to contact the platform operated device, and also to actuate, with a certain fixed and definite movement, the article releasing mechanism in unison with its own movement; means consisting of a compensating or take up device to control the operation of the said intermediate mechanism to render the article releasing mechanism operative either jointly with, or, by a differential action, without actuating the weighing mechanism; and manually actuated means having a fixed movement to control either the article releasing mechanism alone, or jointly, the same and the mechanism to give a denotation of a weight, and having a compensating or take up device for varying weights to produce a differential action; in combination with means to return, after either of the operations has been had, the parts to their normal disengaged and locked condition.

9. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a plurality of normally non-operative article releasing mechanisms, each comprising a plurality of elements coöperatively acting to release a predetermined quantity of stock only at each operation, and normally disengaged from and unaffected by the operation of the device actuated by the movement of the platform; and an intermediate mechanism comprising a plurality of elements adapted to be but once moved by the coin a variable distance according to the particular weight on the platform, and to move the weight denotating mechanism with a positive impelling movement to contact the platform operated device, and having a compensating or take up device for varying weights to produce a differential action according to the weight on the platform, and having means to simultaneously actuate interchangeably the several article releasing mechanisms with a positive impelling movement a certain fixed and definite distance in unison with its own movement; in combination with means to return, after either of the operations has been had, the parts to their normal disengaged and locked condition.

10. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a plurality of normally non-operative article releasing mechanisms, each comprising a plurality of elements coöperatively acting to release a predetermined quantity of stock only at each operation, and normally disengaged from and unaffected by the operation of the device actuated by the movement of the platform; an intermediate mechanism comprising a plurality of elements adapted to be but once moved by the coin a variable distance according to the particular weight on the platform, and to move the weight denotating mechanism with a positive impelling movement to contact the platform operated device, and having a compensating or take up device for varying weights to produce a differential action according to the weight on the platform, and having means to simultaneously actuate interchangeably the several article releasing mechanisms with a positive impelling movement a certain fixed and definite distance in unison with its own movement; and means consisting of a compensating or take up device to control the operation of the said intermediate mechanism to render the article releasing mechanism operative either jointly with, or, by a differential action, without actuating the weighing mechanism; in combination with means to return, after either of the operations has been had, the parts to their normal disengaged and locked condition.

11. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a plurality of normally non-operative article releasing mechanisms, each comprising a plurality of elements coöperatively acting to release a predetermined quantity of stock only at each operation, and normally disengaged from and unaffected by the operation of the device actuated by the movement of the platform; an intermediate mechanism comprising a plurality of elements adapted to be but once moved by the coin a variable distance according to the particular weight on the platform, and to move the weight denotating mechanism with a positive impelling movement to contact the platform operated device, and having a compensating or take up device for varying weights to produce a differential action according to the weight on the platform, and having means to simultaneously actuate interchangeably the several article releasing mechanisms with a positive impelling movement a certain fixed and definite distance in unison with its own movement; and a plurality of independent manually actuated devices having a fixed movement, to control either one of the article releasing mechanisms alone, or simultaneously, several of the same differentially, or, jointly, both the same and the weighing mechanisms and the mechanism to give a denotation of a weight, and having a compensating or take up device for varying weights to produce a differential action; in combination with means to return, after either of the operations has been had, the parts to their normal disengaged and locked condition.

12. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; a plurality of normally non-operative article releasing mechanisms, each comprising a plurality of elements coöperatively acting to release a predetermined quantity of stock only at each operation, and normally disengaged from and unaffected by the operation of the device actuated by the movement of the platform; an intermediate mechanism comprising a plurality of elements adapted to be but once moved by the coin a variable distance according to the particular weight on the platform, and to move the weight denotating mechanism with a positive impelling movement to contact the platform operated device, and having a compensating or take up device for varying weights to produce a differential action according to the weight on the platform, and having means to simultaneously actuate interchangeably the several article releasing mechanisms with a positive impelling movement a certain fixed and definite distance in unison with its own movement; means consisting of a compensating or take up device to control the operation of the said intermediate mechanism to render the article releasing mechanism operative either jointly with, or, by a differential action, without actuating the weighing mechanism; and a plurality of independent manually actuated devices having a fixed movement, to control either one of the article releasing mechanisms alone, or simultaneously, several of the same differentially, or, jointly, both the same and the weighing mechanism and the mechanism to give a denotation of a weight, and having a compensating or take up device for varying weights to produce a differential action; in combination with means to return, after either of the operations has been had, the parts to their normal disengaged and locked condition.

13. In a coin controlled machine, a normally movable platform, and a mechanism adapted to move in unison therewith; a mechanism comprising a plurality of elements coöperatively acting to give a single denotation of a weight only, of a fixed and determinate character and corresponding with the load on the platform, at each operation; means normally disengaged from and unaffected by the descent or retrograde movement of the platform and the platform operated device, to hold the weight denotating mechanism in a non-operative condition; and an intermediate mechanism comprising a plurality of elements adapted to be but once moved by the coin a variable distance according to the particular weight on the platform, and to move the weight denotating mechanism with a positive impelling movement to contact the platform operated device; in combination with means to return, after either of the operations has been had, the parts to their normal disengaged and locked condition.

14. In a coin controlled machine, a normally movable platform, $b$, and mechanism to move in unison therewith comprising a platform rod $k$, ribbon $l$, spindle $o$, quadrant $s$, pinion $t$, arbor $u$, and rod or bar $v$; mechanism comprising a swinging arm H, bar $J^{10}$, cord K and shutters M coöperatively acting to give a single denotation of a weight only, of a fixed and determinate character and corresponding with the platform load, at each operation; means comprising a lever $o'$ normally disengaged from and unaffected by the descent or retrograde movement of the platform and the platform operated device to hold the weight denotating mechanism in a non-operative condition; a plurality of normally non-operative article releasing mechanisms each comprising a plate $D^3$ and recess $D^4$ coöperatively acting to release a predetermined quantity of stock only at each operation, and normally disengaged from and unaffected by the operation of the mechanism actuated by the movement of the platform; a coin controlled intermediate device comprising a sleeve D, arm J, arm $d'$, pinion $z$, arbor $y$, stop $m'$ and compensating spring $o^2$, normally disengaged from and unaffected by the descent or retrograde movement of the platform and the platform operated device, but impelled by the coin and adapted to move positively both the weight denotating device and one of the article releasing mechanisms in unison with its own movement once only upon the insertion of a coin; in combination with means comprising the counterpoise $m$, $p$, and weight $c'$ to return, after either of the operations has been had, the parts to their normal disengaged and locked condition.

In testimony of the foregoing specification I do hereby sign the same in the city of New York, county and State of New York this 17th day of March, 1910.

JONATHAN O. FOWLER.

Witnesses:
 ROB. SCHWARZ,
 H. WOELFLER.

Copies of this patent may be obtained for five cents each, by addressing the "Commissioner of Patents, Washington, D. C."